(12) United States Patent
Vermani et al.

(10) Patent No.: US 11,956,743 B2
(45) Date of Patent: *Apr. 9, 2024

(54) RELATIVE TIMING DRIFT CORRECTION FOR DISTRIBUTED MULTI-USER TRANSMISSIONS

(71) Applicant: QUALCOMM Incorporated, San Diego, CA (US)

(72) Inventors: Sameer Vermani, San Diego, CA (US); Bin Tian, San Diego, CA (US); Lin Yang, San Diego, CA (US); Jialing Li Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/062,839

(22) Filed: Dec. 7, 2022

(65) Prior Publication Data

US 2023/0180160 A1 Jun. 8, 2023

Related U.S. Application Data

(63) Continuation of application No. 16/659,253, filed on Oct. 21, 2019, now Pat. No. 11,533,694.

(Continued)

(51) Int. Cl.
*H04W 92/20* (2009.01)
*H04W 56/00* (2009.01)

(52) U.S. Cl.
CPC ........ *H04W 56/0015* (2013.01); *H04W 92/20* (2013.01)

(58) Field of Classification Search
CPC ...... H04B 7/024; H04W 56/00; H04W 92/20; H04W 56/0015; H04L 5/00
See application file for complete search history.

(56) References Cited

U.S. PATENT DOCUMENTS 6,510,174 B1 * 1/2003 Sexton ............... H04B 17/382
375/228
9,161,362 B1 10/2015 Banerjea et al.
(Continued)

FOREIGN PATENT DOCUMENTS

WO 2015066680 A2 5/2015
WO 2016178982 A1 11/2016

OTHER PUBLICATIONS

European Search Report—EP23177820—Search Authority—Berlin—dated Aug. 18, 2023.
(Continued)

*Primary Examiner* — Hassan A Phillips
*Assistant Examiner* — Prenell P Jones
(74) *Attorney, Agent, or Firm* — Arun Swain

(57) ABSTRACT

This disclosure provides systems, methods, apparatus, and computer programs encoded on computer storage media, for relative timing drift correction for distributed multi-user transmissions. In one aspect, a first access point (AP) may receive a first signal from a second AP. The first signal may be associated with a channel sounding procedure to be performed substantially simultaneously by the second AP and the first AP. The first AP may then receive a second signal from the second AP, and prior to a substantially simultaneous transmission by the second AP and the first AP. The second signal may include timing information relative to the first signal. The first AP may determine a start time of the substantially simultaneous transmission at the first AP based on the timing information, and may initiate the substantially simultaneous transmission according to the determined start time.

20 Claims, 10 Drawing Sheets

Related U.S. Application Data

(60) Provisional application No. 62/753,784, filed on Oct. 31, 2018.

(56) References Cited

U.S. PATENT DOCUMENTS

| | | | |
|---|---|---|---|
| 9,344,312 B2 | 5/2016 | Seok | |
| 9,363,004 B2 | 6/2016 | Kis et al. | |
| 10,045,349 B2 | 8/2018 | Aterfi | |
| 10,178,673 B1 | 1/2019 | Jiang et al. | |
| 10,555,257 B2 | 2/2020 | Yang | |
| 10,897,285 B2 | 1/2021 | Vermani et al. | |
| 10,972,190 B2 | 4/2021 | Henningsen et al. | |
| 11,039,382 B2 | 6/2021 | Niu et al. | |
| 11,102,724 B2 | 8/2021 | Atefi | |
| 11,533,694 B2 | 12/2022 | Vermani et al. | |
| 2003/0153273 A1 | 8/2003 | Ebert et al. | |
| 2009/0052429 A1 | 2/2009 | Pratt et al. | |
| 2012/0250670 A1 | 10/2012 | Cordeiro | |
| 2012/0263084 A1 | 10/2012 | Liu et al. | |
| 2012/0263085 A1 | 10/2012 | Liu et al. | |
| 2012/0263086 A1 | 10/2012 | Liu et al. | |
| 2013/0315218 A1 | 11/2013 | Cheong et al. | |
| 2014/0056205 A1 | 2/2014 | Aboul-Magd et al. | |
| 2014/0248055 A1* | 9/2014 | Freda | H04L 9/0827 398/96 |
| 2014/0328242 A1 | 11/2014 | Tong et al. | |
| 2014/0334420 A1 | 11/2014 | You et al. | |
| 2015/0063327 A1 | 3/2015 | Barriac et al. | |
| 2015/0124677 A1 | 5/2015 | Asterjadhi | |
| 2015/0270880 A1 | 9/2015 | Harel et al. | |
| 2015/0341955 A1 | 11/2015 | Sampath et al. | |
| 2016/0079987 A1 | 3/2016 | Gurumani et al. | |
| 2016/0142122 A1 | 5/2016 | Merlin et al. | |
| 2016/0143026 A1 | 5/2016 | Seok | |
| 2016/0241382 A1 | 8/2016 | Kang et al. | |
| 2016/0277882 A1 | 9/2016 | Passler | |
| 2016/0278081 A1 | 9/2016 | Chun et al. | |
| 2016/0295631 A1 | 10/2016 | Gubeskys et al. | |
| 2016/0323424 A1 | 11/2016 | Merlin et al. | |
| 2016/0360483 A1 | 12/2016 | Liu et al. | |
| 2017/0086212 A1 | 3/2017 | Kim et al. | |
| 2017/0093600 A1 | 3/2017 | Li et al. | |
| 2017/0171878 A1 | 6/2017 | Chun et al. | |
| 2018/0084555 A1 | 3/2018 | Mori et al. | |
| 2018/0132278 A1 | 5/2018 | Oteri et al. | |
| 2018/0205589 A1* | 7/2018 | Bai | H04L 27/2646 |
| 2018/0234135 A1 | 8/2018 | Vermani et al. | |
| 2018/0310133 A1 | 10/2018 | Ramasamy et al. | |
| 2018/0310195 A1* | 10/2018 | Zhang | H04L 5/0057 |
| 2019/0075538 A1 | 3/2019 | Bar-Shalom et al. | |
| 2019/0190761 A1* | 6/2019 | Liu | H04L 5/0007 |
| 2019/0306825 A1 | 10/2019 | Lindskog et al. | |
| 2019/0379439 A1* | 12/2019 | Bolin | H04B 7/0617 |
| 2020/0028636 A1* | 1/2020 | Tang | H04W 72/20 |
| 2020/0092807 A1 | 3/2020 | Li et al. | |
| 2020/0153488 A1* | 5/2020 | Wu | H04B 7/0689 |
| 2020/0163097 A1* | 5/2020 | Qin | H04W 56/00 |
| 2020/0196241 A1 | 6/2020 | Lou et al. | |
| 2020/0314220 A1 | 10/2020 | Segev et al. | |
| 2020/0336973 A1 | 10/2020 | Niu et al. | |

OTHER PUBLICATIONS

International Preliminary Report on Patentability—PCT/US2019/057480, The International Bureau of WIPO—Geneva, Switzerland, dated May 14, 2021.

International Search Report and Written Opinion—PCT/US2019/057480—ISA/EPO—dated Jan. 28, 2020.

Taiwan Search Report—TW108138220—TIPO—dated Nov. 14, 2022.

* cited by examiner

RELATIVE TIMING DRIFT CORRECTION FOR DISTRIBUTED MULTI-USER TRANSMISSIONS

CROSS-REFERENCE TO RELATED APPLICATIONS

This patent application is a Continuation of U.S. patent application Ser. No. 16/659,253 by VERMANI et al., entitled "RELATIVE TIMING DRIFT CORRECTION FOR DISTRIBUTED MULTI-USER TRANSMISSIONS," filed Oct. 21, 2019, which claims priority to U.S. Provisional Patent Application Ser. No. 62/753,784 by VERMANI et al., entitled "RELATIVE TIMING DRIFT CORRECTION FOR DISTRIBUTED MULTI-USER TRANSMISSIONS," filed Oct. 31, 2018, each of which is assigned to the assignee hereof. The disclosure of the prior applications are considered part of and are incorporated by reference in this patent application.

TECHNICAL FIELD

This disclosure relates to wireless communications, and more specifically to relative timing drift correction for distributed multi-user transmissions.

DESCRIPTION OF THE RELATED TECHNOLOGY

Wireless communications systems are widely deployed to provide various types of communication content such as voice, video, packet data, messaging, broadcast, and so on. These systems may be multiple-access systems capable of supporting communication with multiple users by sharing the available system resources (such as time, frequency, and power). A wireless network, for example a WLAN, such as a Wi-Fi (i.e., Institute of Electrical and Electronics Engineers (IEEE) 802.11) network may include one or more access points (AP(s)) that may communicate with one or more stations or mobile devices. The AP may be coupled to a network, such as the Internet, and may enable a mobile device to communicate via the network (or communicate with other devices coupled to the AP). A wireless device may communicate with a network device bi-directionally. For example, in a WLAN, a station may communicate with an associated AP via downlink (DL) and uplink (UL). The DL (or forward link) may refer to the communication link from the AP to the station, and the UL (or reverse link) may refer to the communication link from the station to the AP.

SUMMARY

The systems, methods and devices of this disclosure each have several innovative aspects, no single one of which is solely responsible for the desirable attributes disclosed herein. One innovative aspect of the subject matter described in this disclosure can be implemented in a method for wireless communication at a first access point (AP). The method can include receiving, from a second AP, a first signal associated with a channel sounding procedure to be performed simultaneously by the second AP and the first AP, receiving, from the second AP and prior to a substantially simultaneous transmission by the second AP and the first AP, a second signal including timing information relative to the first signal, a second signal including timing information relative to the first signal, determining a start time of the substantially simultaneous transmission at the first AP based on the timing information, and initiating the substantially simultaneous transmission according to the determined start time.

In some implementations, the method can include estimating a timing of reception of the first signal associated with the channel sounding procedure to be performed by the second AP, performing, by the first AP, the channel sounding procedure based on the timing of reception of the first signal, and identifying a time period based on the second signal, where determining the start time of the substantially simultaneous transmission includes determining that the identified time period has elapsed since an event of the channel sounding procedure can be performed by the first AP.

In some implementations, the event of the channel sounding procedure can include one or more of a timing of reception of a synchronization trigger signal prior to a null data packet (NDP), a timing of reception of beginning of a null data packet announcement (NDPA), a timing of reception of end of the NDPA, a timing associated with a beginning of the NDP, a timing associated with an end of the NDP, or a combination thereof.

In some implementations, the time period can be indicated in the second signal using one or more of a timing synchronization counter, a clock common to the first AP and the second AP, or a combination thereof. In some implementations, the method can include estimating a timing of reception of the first signal associated with the channel sounding procedure, performing, by the first AP, the channel sounding procedure based on the timing of reception of the first signal, and determining a time period based on the second signal, the time period being a multiple of a timing grid interval, where determining the start time of the substantially simultaneous transmission includes determining that the identified time period has elapsed since an event of the channel sounding procedure can be performed by the first AP.

In some implementations, the method can include determining the timing grid boundaries based on the first signal associated with the channel sounding procedure, where the presence of the timing grid can be indicated by setting a bit included in the first signal or the second signal. In some implementations, the method can include receiving a broadcast packet associated with the substantially simultaneous transmission, and determining the timing grid interval based on the received broadcast packet.

In some implementations, the broadcast packet includes at least one packet of a beacon associated with the substantially simultaneous transmission, at least one packet of a request to send (RTS) signal associated with the substantially simultaneous transmission, at least one packet of a clear to send (CTS) signal associated with the substantially simultaneous transmission, or a combination thereof.

In some implementations, the method can include estimating a timing of reception of the first signal associated with the channel sounding procedure, and estimating a timing of reception of the second signal associated with the substantially simultaneous transmission, where determining the start time of the substantially simultaneous transmission can include rounding off the timing of reception of the second signal to a multiple of a timing grid interval.

In some implementations, the second signal associated with the substantially simultaneous transmission can include a synchronization trigger signal to the first AP prior to the substantially simultaneous transmission. In some implementations, the timing information relative to the first signal can be included in at least one of a payload of the second signal, a preamble of the second signal, or a combination thereof.

In some implementations, the method can include identifying a bit included in the second signal to indicate that the start time of the substantially simultaneous transmission at the first AP can be to be determined using an estimated time of reception of the first signal at the first AP and the timing information relative to the first signal, where determining the start time of the substantially simultaneous transmission can be based on the identified bit.

Another innovative aspect of the subject matter described in this disclosure can be implemented in a method for wireless communication. The method can include transmitting, to a first AP, a first signal associated with a channel sounding procedure, transmitting, to the first AP, a second signal including timing information relative to the first signal, where a start time of a substantially simultaneous transmission at the first AP can be determined based on the timing information, and performing, in conjunction with the first AP, the substantially simultaneous transmission, where the substantially simultaneous transmission at the first AP can be performed according to the determined start time.

In some implementations, the method can include configuring the second signal to indicate a time period, where the start time of the substantially simultaneous transmission can be determined based on determining that the configured time period has elapsed since an event of the channel sounding procedure can be performed by the first AP. In some implementations, the event of the channel sounding procedure can include one or more of: a timing of reception of a synchronization trigger signal prior to an NDP, a timing of reception of beginning of an NDPA, a timing of reception of end of the NDPA, a timing associated with a beginning of the NDP, a timing associated with an end of the NDP, or a combination thereof.

In some implementations, the time period can be indicated in the second signal using one or more of a timing synchronization counter, a clock common to the first AP and a second AP, or a combination thereof. In some implementations, the method can include configuring the second signal to indicate a time period, the time period being a multiple of a timing grid interval, the start time of the substantially simultaneous transmission can be determined based on determining that the identified time period has elapsed since an event of the channel sounding procedure can be performed by the first AP.

In some implementations, the method can include setting a bit included in the first signal associated with the channel sounding procedure to indicate the presence of a timing grid, where transmitting the first signal can include transmitting the bit to the first AP. In some implementations, the method can include transmitting a broadcast packet associated with the substantially simultaneous transmission, where the timing grid interval can be determined based on the transmitted broadcast packet. In some implementations, the broadcast packet can include at least one packet of a beacon associated with the substantially simultaneous transmission, at least one packet of an RTS signal associated with the substantially simultaneous transmission, at least one packet of a CTS signal associated with the substantially simultaneous transmission, or a combination thereof.

In some implementations, the method can include setting a bit included in the second signal to indicate the presence of a timing grid, where transmitting the second signal can include transmitting the bit to the first AP. In some implementations, the timing information relative to the first signal can be included in at least one of a payload of the second signal, a preamble of the second signal, or a combination thereof. In some implementations, the method can include setting a bit included in the second signal to indicate that the start time of the substantially simultaneous transmission at the first AP can be to be determined using an estimated time of reception of the first signal at the first AP and the timing information relative to the first signal.

Another innovative aspect of the subject matter described in this disclosure can be implemented in an apparatus for wireless communication. The apparatus can include means for receiving, from a second AP, a first signal associated with a channel sounding procedure to be performed simultaneously by the second AP and the first AP, means for receiving, from the second AP and prior to a substantially simultaneous transmission by the second AP and the first AP, a second signal including timing information relative to the first signal, a second signal including timing information relative to the first signal, means for determining a start time of the substantially simultaneous transmission at the first AP based on the timing information, and means for initiating the substantially simultaneous transmission according to the determined start time.

Another innovative aspect of the subject matter described in this disclosure can be implemented in an apparatus for wireless communication. The apparatus can include a first interface, a second interface, and a wireless modem configured to obtain via the first interface a first signal associated with a channel sounding procedure to be performed substantially simultaneously by the second AP and the first AP received from the second AP, obtain via the first interface a second signal including timing information relative to the first signal from the second AP and prior to a substantially simultaneous transmission by the second AP and the first AP, determine a start time of the substantially simultaneous transmission at the first AP based on the timing information, and output the substantially simultaneous transmission via the second interface for transmission according to the determined start time.

Another innovative aspect of the subject matter described in this disclosure can be implemented in a non-transitory computer readable medium for wireless communication. The non-transitory computer-readable medium can include instructions operable to cause a processor to receive, from a second AP, a first signal associated with a channel sounding procedure to be performed simultaneously by the second AP and the first AP, receive, from the second AP and prior to a substantially simultaneous transmission by the second AP and the first AP, a second signal including timing information relative to the first signal, a second signal including timing information relative to the first signal, determine a start time of the substantially simultaneous transmission at the first AP based on the timing information, and initiate the substantially simultaneous transmission according to the determined start time.

Another innovative aspect of the subject matter described in this disclosure can be implemented in an apparatus for wireless communication. The apparatus can include means for transmitting, to a first AP, a first signal associated with a channel sounding procedure, means for transmitting, to the first AP, a second signal including timing information relative to the first signal, where a start time of a substantially simultaneous transmission at the first AP can be determined based on the timing information, and means for performing, in conjunction with the first AP, the substantially simultaneous transmission, where the substantially simultaneous transmission at the first AP can be performed according to the determined start time.

Another innovative aspect of the subject matter described in this disclosure can be implemented in an apparatus for wireless communication. The apparatus can include a first interface, a second interface, and a wireless modem configured to output a first signal associated with a channel sounding procedure via the second interface for transmission to a first AP, output a second signal including timing information relative to the first signal, where a start time of a substantially simultaneous transmission at the first AP is determined based on the timing information, via the second interface for transmission to the first AP, and output, in conjunction with the first AP, the substantially simultaneous transmission via the second interface for transmission, where the substantially simultaneous transmission at the first AP is outputted according to the determined start time.

Another innovative aspect of the subject matter described in this disclosure can be implemented in a non-transitory computer readable medium for wireless communication. The non-transitory computer-readable medium can include instructions operable to cause a processor to transmit, to a first AP, a first signal associated with a channel sounding procedure, transmit, to the first AP, a second signal including timing information relative to the first signal, where a start time of a substantially simultaneous transmission at the first AP can be determined based on the timing information, and perform, in conjunction with the first AP, the substantially simultaneous transmission, where the substantially simultaneous transmission at the first AP can be performed according to the determined start time.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
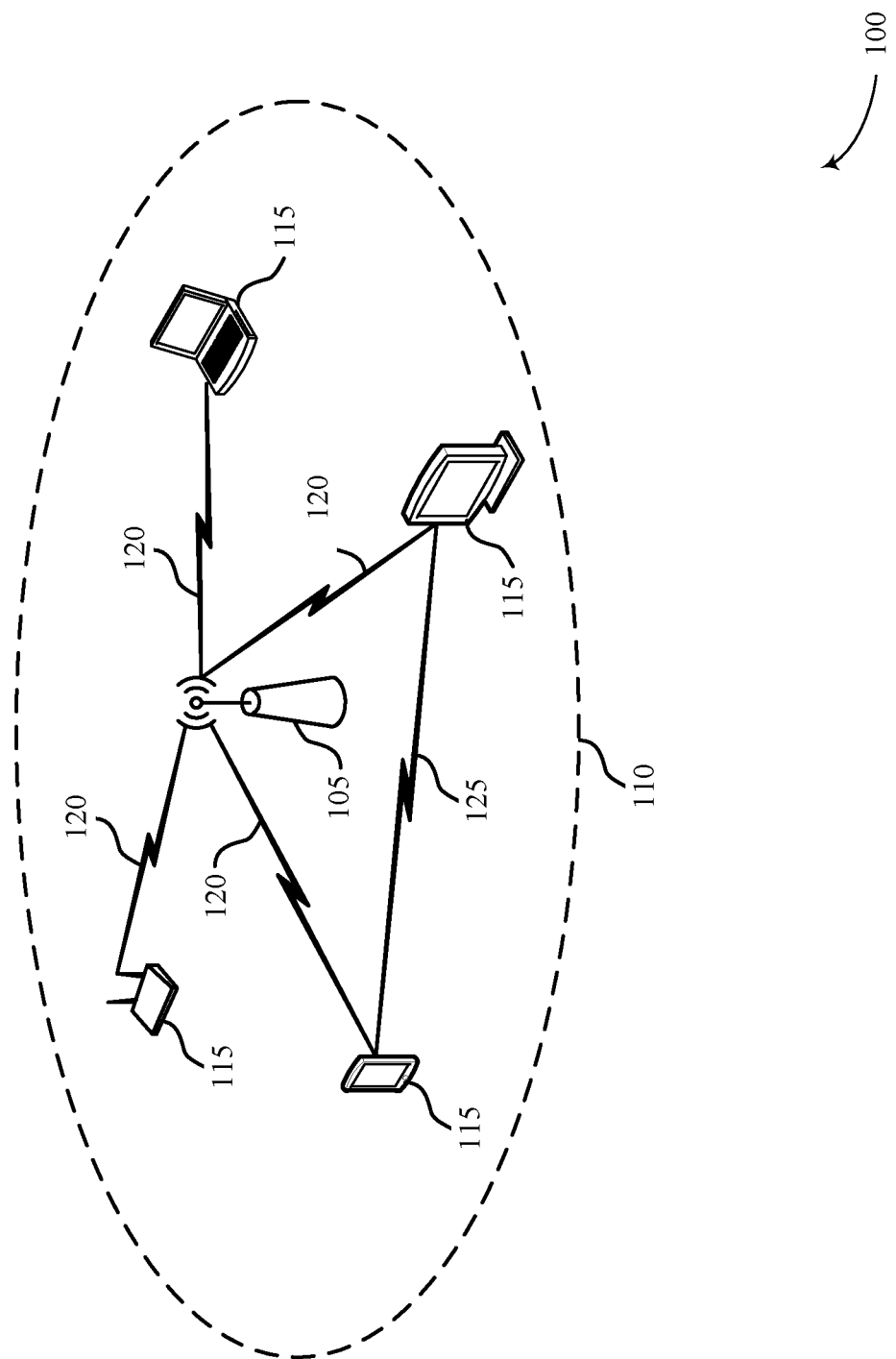
FIG. 1 shows an example of a system for wireless communications that supports relative timing drift correction for distributed multi-user transmissions.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Techniques are described in which relative timing drift correction may be achieved for distributed multi-user transmissions. Wireless communication systems may be configured to support multi-user transmissions in which multiple access points (AP(s)) perform wireless communications with their associated wireless stations during a transmission opportunity. In some implementations, an AP may signal to other APs that extra resources are available, and these extra resources may be used by the other AP(s) performing wireless communications with their associated wireless stations. Generally, the AP that captures or otherwise obtains access to the channel may be referred to in this context as a master AP while the other AP(s) participating in the multi-user transmission may be considered as slave AP(s).

A multi-user transmission may be associated with a channel sounding procedure and a joint transmission procedure. During the channel sounding procedure, a master AP may be configured to send a null data packet (NDP) to one or more stations. Additionally, a slave AP may be configured to send an NDP to one or more stations. The NDP sent by the slave AP may be sent simultaneously, or substantially simultaneously, with the NDP sent by the master AP. In some implementations, the master AP may send a null data packet announcement (NDPA) or a synchronization trigger signal to at least one of the slave AP(s), prior to sending the NDP. Thus, the slave AP(s) may receive a first signal indicating that an event of the channel sounding procedure is performed at the master AP. Upon receiving the signal, the slave AP(s) may estimate a timing of reception of the signal, and may perform the event of the channel sounding procedure based on the estimated timing. Similarly, during the joint transmission procedure, the slave AP(s) may receive a second signal including an indication of a start time of the joint transmission at the master AP. Based on the timing of the received indication, the slave AP(s) may estimate a start time of the joint transmission to be performed at the slave AP(s). However, there may be a first timing offset between the master AP and the slave AP during the event of channel sounding procedure, and a second timing offset between the master AP and the slave AP during the joint transmission procedure. To reduce the difference between the first timing offset and the second timing offset, in the second signal transmitted during the joint transmission procedure, the master AP may indicate timing information relative to the first signal.

In some implementations, the master AP may indicate that a joint transmission procedure at the master AP is being performed after lapse of a time period since an event of the channel sounding procedure. In some implementations, the slave AP may receive the timing indication in a synchronization trigger signal prior to the start of the joint transmission procedure. Upon receiving the synchronization trigger signal, the slave AP(s) may determine a time when the time period indicated in the synchronization trigger signal elapses after the event of the channel sounding procedure is performed by the slave AP. Based on the time period indicated in the synchronization trigger, the slave AP(s) may determine a start time for the joint transmission procedure. In some implementations, the presence of the time period may be indicated by setting a bit in the synchronization trigger.

In some implementations, the slave AP may determine the time period indicated by the master AP, as a multiple of a timing grid interval. The master AP may indicate a presence of the timing grid by setting a bit included in the first signal transmitted during the channel sounding procedure or in the second signal transmitted during the joint transmission procedure.

Particular implementations of the subject matter described in this disclosure can be implemented to realize one or more of the following potential advantages. Specifically, the techniques described for coordinating multi-user transmissions may reduce the change in timing offsets between master AP(s) and slave AP(s), the change being measured between the sounding procedure and the joint transmission procedure. This reduction in difference of timing offsets may decrease cross-stream leakage during the multi-user transmissions and ensure that the channel seen by a multi-user transmission is consistent with the precoder used to transmit on that channel. Additionally, the techniques described for coordinating multi-user transmissions may reduce estimation error by the master AP conveying the time elapsed since the sounding procedure to slave AP(s). In some implementations, the slave AP(s) may be configured to calculate timing estimates based on a timing grid common to the master AP and the slave AP(s), thereby reducing estimation errors.

FIG. 1 shows an example of a system for wireless communications that supports relative timing drift correction for distributed multi-user transmissions. The system for wireless communications may include a wireless local area network (WLAN) 100 (also known as a Wi-Fi network). The WLAN 100 may include an AP 105 and multiple associated stations 115, which may represent devices such as mobile stations, personal digital assistant (PDAs), other handheld devices, netbooks, notebook computers, tablet computers, laptops, display devices (such as TVs, computer monitors, etc.), printers, etc. The AP 105 and the associated stations 115 may represent a basic service set (BSS) or an extended service set (ESS). The various stations 115 in the network are able to communicate with one another through the AP 105. Also shown is a coverage area 110 of the AP 105, which may represent a basic service area (BSA) of the WLAN 100. An extended network station (not shown) associated with the WLAN 100 may be coupled with a wired or wireless distribution system that may allow multiple AP(s) 105 to be connected in an ESS.

Although not shown in FIG. 1, a station 115 may be located in the intersection of more than one coverage area 110 and may associate with more than one AP 105. A single AP 105 and an associated set of stations 115 may be referred to as a BSS. An ESS is a set of connected BSSs. A distribution system (not shown) may be used to connect AP(s) 105 in an ESS. In some implementations, the coverage area 110 of an AP 105 may be divided into sectors (also not shown). The WLAN 100 may include AP(s) 105 of different types (such as metropolitan area, home network, etc.), with varying and overlapping coverage areas 110. Two stations 115 also may communicate directly via a direct wireless link 125 regardless of whether both stations 115 are in the same coverage area 110. Examples of direct wireless links 120 may include Wi-Fi Direct connections, Wi-Fi Tunneled Direct Link Setup (TDLS) links, and other group connections. Stations 115 and AP(s) 105 may communicate according to the WLAN radio and baseband protocol for physical and media access control (MAC) layers from IEEE 802.11 and versions including, but not limited to, 802.11b, 802.11g, 802.11a, 802.11n, 802.11ac, 802.11ad, 802.11ah, 802.11ax, 802.11-EHT, etc. In some other implementations, peer-to-peer connections or ad hoc networks may be implemented within WLAN 100.

In some implementations, a station 115 (or an AP 105) may be detectable by a central AP 105, but not by other stations 115 in the coverage area 110 of the central AP 105. For example, one station 115 may be at one end of the coverage area 110 of the central AP 105 while another station 115 may be at the other end. Thus, both stations 115 may communicate with the AP 105, but may not receive the transmissions of the other. This may result in colliding transmissions for the two stations 115 in a contention based environment (such as CSMA/CA) because the stations 115 may not refrain from transmitting on top of each other. A station 115 whose transmissions are not identifiable, but that is within the same coverage area 110 may be known as a hidden node. CSMA/CA may be supplemented by the exchange of an RTS packet transmitted by a sending station 115 (or AP 105) and a CTS packet transmitted by the receiving station 115 (or AP 105). This may alert other devices within range of the sender and receiver not to transmit for the duration of the primary transmission. Thus, RTS/CTS may help mitigate a hidden node problem.

Figure 2:
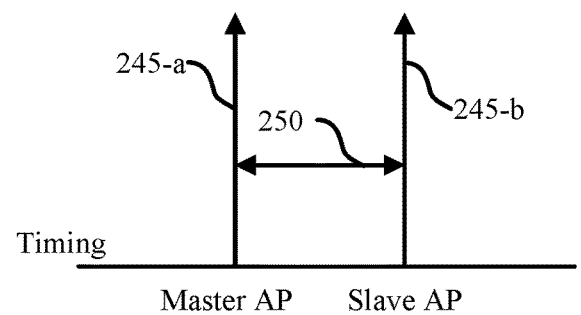
FIG. 2 shows an example channel sounding procedure that supports relative timing drift correction for distributed multi-user transmissions.
Figure 2:
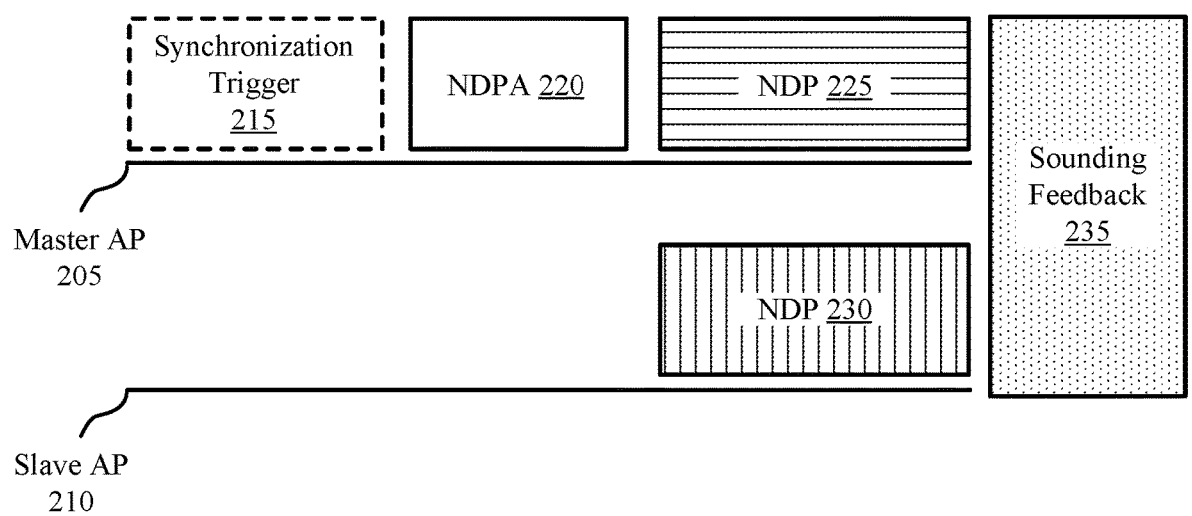

FIG. 2 shows an example channel sounding procedure 200 that supports relative timing drift correction for distributed multi-user transmissions. In some implementations, the channel sounding procedure 200 may implement aspects of the system for wireless communications 100. Aspects of the channel sounding procedure 200 may be implemented in a wireless network such as a Wi-Fi network implementing the one or more 802.11 family of standards, such as, 802.11be, 802.11ax, 802.11ac, or some other Wi-Fi standard. Generally, wireless communication systems (such as, the system for wireless communications 100) may be configured to support distributed multi-user transmissions. In an example of a distributed multi-user transmission, multiple AP(s) may perform wireless communications with their associated wireless stations during a transmission opportunity. According to some examples, a distributed multi-user transmission may be associated with a channel sounding procedure (such as, channel sounding procedure 200) and a joint transmission procedure. Additionally, or alternatively, the channel sounding procedure 200 (such as, power measurements) may be performed between multiple AP(s), and between multiple wireless stations. One or more aspects of the channel sounding procedure 200 may be implemented by a wireless station and an AP, which may be examples of the corresponding devices described herein.

As depicted in the example of FIG. 2, the channel sounding procedure 200 may be implemented by a set of participating AP(s) (for example, the set of participating AP(s) including a master AP and a slave AP). The AP(s) may belong to the same BSS or may belong to different BSSs. In some examples, an AP may signal to other AP(s) that extra resources are available. The other AP(s) may use these extra resources for performing wireless communications with their associated wireless stations. In some aspects, the AP that is coordinating the distributed multi-user transmissions (i.e., gaining access to a channel) may be considered a master AP and the other AP(s) participating in the distributed multi-user transmissions may be considered slave AP(s) (or a second AP or a neighboring AP). The master AP 205 may be an example of an AP as described with reference to FIG. 1. Additionally, or alternatively, the slave AP 210 may be an example of an AP as described with reference to FIG. 1.

According to one or more aspects, wireless networks may be configured to support transmissions during the channel sounding procedure 200. Broadly, the associated transmissions may include uplink or downlink transmissions between AP(s) and their associated wireless stations. Conventionally, during the channel sounding procedure, a master AP may be configured to send an NDP to one or more stations. In some instances, a slave AP also may be configured to send an NDP to one or more stations. Additionally, or alternatively, prior to sending the NDP, the master AP may obtain access to the channel, and may send a transmission or a first signal (such as, a synchronization trigger signal, an NDPA, etc.) to at least one of the slave AP(s). For example, the master AP may transmit or otherwise provide an indication of the synchronization trigger signal to at least one of the slave AP(s). In some implementations, the synchronization trigger signal may confirm that the slave AP(s) participating in a joint transmission procedure, as described with reference to FIG. 3. For instance, the master AP may transmit a first signal to indicate an NDP transmission to be performed at the master AP. That is, the slave AP(s) may receive the first signal, and may determine that an event of the channel sounding procedure is performed at the master AP.

Upon receiving the first signal (i.e., synchronization trigger signal, an NDPA, etc.) from the master AP, the slave AP(s) may estimate a time associated with the event of the channel sounding procedure performed at the master AP. The slave AP(s) may then perform the channel sounding procedure based on the estimated time. In some implementations, there may be a first timing offset between the master AP and at least one of the slave AP(s) during the channel sounding procedure. Additionally, during the joint transmission procedure, as further described with reference to FIG. 3, the slave AP(s) may receive a signal indicating a start time of a joint transmission at the master AP. In some implementations, the one or more slave AP(s) may utilize the received signal to estimate a start time associated with performing the joint transmission. In some implementations, there may be a second timing offset between the master AP and at least one of the slave AP(s) during the joint transmission procedure. Conventional techniques do not resolve the difference between the first timing offset and the second timing offset. In some instances, a large difference between the first timing offset and the second timing offset may result in cross-stream leakage. Cross-stream leakage may refer to spatial streams that can leak into each other. For example, spatial streams transmitted to the stations may leak into each other resulting in precoding becoming imperfect.

One or more aspects of the present disclosure provide for methods to reduce the difference between the first timing offset and the second timing offset. Specifically, according to one or more aspects of the present disclosure, the master AP may indicate timing information in a second signal transmitted during the joint transmission procedure. In some implementations, the timing information included in the second signal may be relative to a first signal transmitted during the channel sounding procedure (such as, channel sounding procedure 200).

As depicted in the example of FIG. 2, a master AP 205 may send a first signal associated with the channel sounding procedure 200. For example, at the master AP 205, the channel sounding procedure 200 may be initialized by sending a synchronization frame (such as, synchronization trigger 215) and an NDPA 220. In some implementations, the NDPA 220 may announce an upcoming NDP 225 transmission at the master AP 205. In another example, the NDPA 220 may be a synchronization message. In some aspects, the synchronization trigger 215 may additionally be transmitted before an NDPA frame (not shown). In some implementations, the master AP may further transmit synchronization frames to allow one or more neighboring AP(s) (such as, slave AP 210) to synchronize and to collect feedback, using explicit or implicit feedback mechanisms. In some aspects, at sounding feedback 235, the master AP 205 may perform a channel sounding between itself and its associated wireless stations concurrently with one or more of the neighboring AP(s) (such as, slave AP 210).

A slave AP 210 may receive the first signal associated with the channel sounding procedure. In some instances, the slave AP 210 may estimate a time associated with the NDP 225 transmission at the master AP 205. The slave AP 210 may then transmit an NDP 230 based on the estimated time. As previously described, there may be a relative time offset between the master AP 205 and the slave AP 210. For instance, there may be a relative time offset between a time of the NDP 225 transmission at the master AP 205 and a time of the NDP 230 transmission at the slave AP 210. In some implementations, this timing offset between AP(s) (such as, the master AP 205 and the slave AP 210) may be referred to as timing offset 250, a sounding stage relative timing offset, or $\delta_1$. In some implementations, the timing offset 250 may be a non-zero value. As described with reference to FIG. 2, the master AP 205 may send a transmission (i.e., the first signal associated with the channel sounding procedure 200, the NDP 225 transmission, etc.) at a time 245-$a$. Additionally, or alternatively, the slave AP 210 may send a transmission (such as, the NDP 230 transmission, etc.) at a time 245-$b$. In some implementations, the NDP 225 transmission at the master AP 205 and the NDP 230 transmission at the slave AP 210 may have a timing offset 250. According to one or more aspects, the master AP 205 may include timing information in a synchronization trigger during the joint transmission procedure to preserve the timing offset 250 across the channel procedure and the joint transmission procedure. In some implementations, the timing information may be configured to carry information associated with a prior event (such as, an event during the channel sounding procedure 200).

Figure 3:
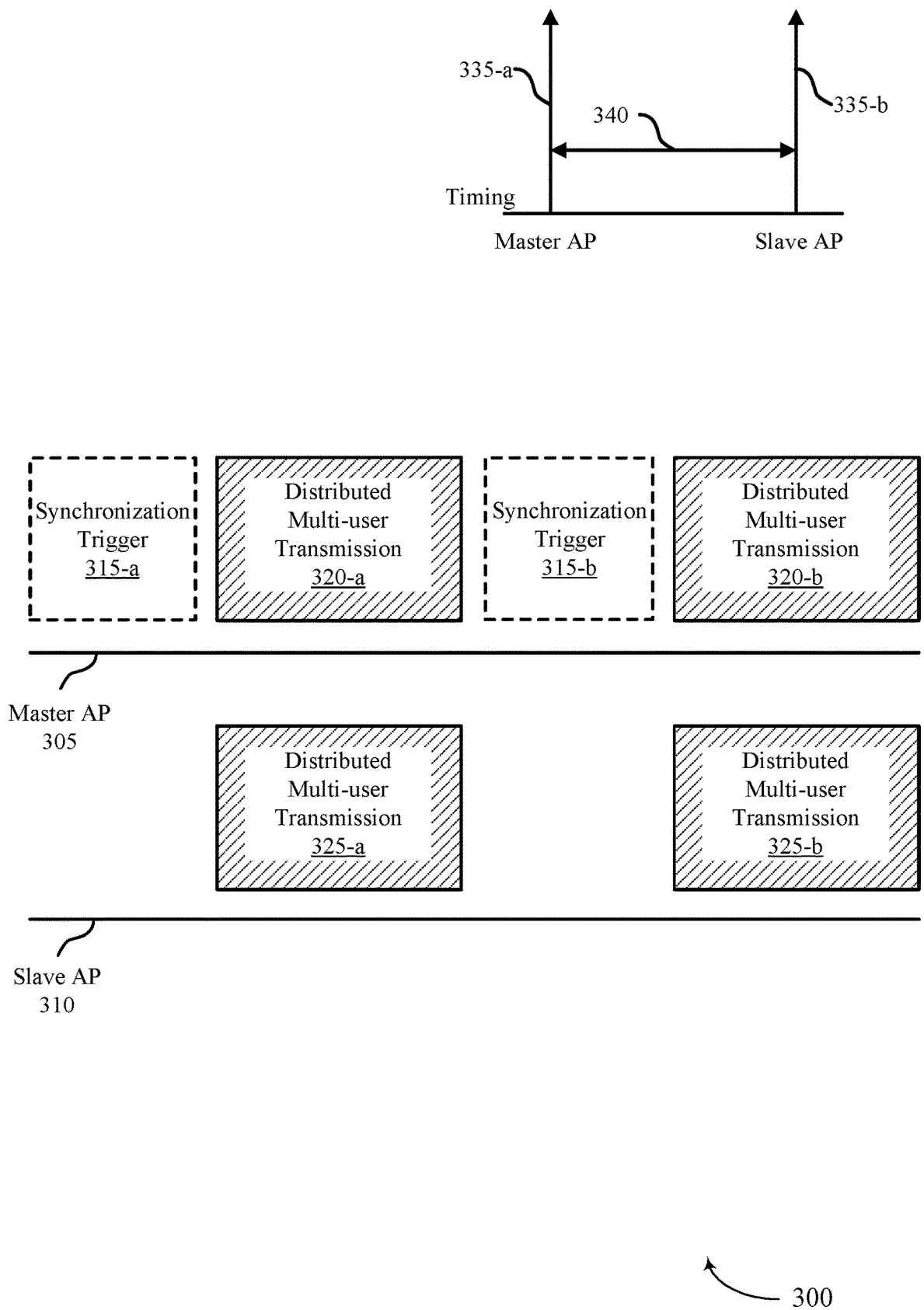
FIG. 3 shows an example joint transmission procedure that supports relative timing drift correction for distributed multi-user transmissions.

FIG. 3 shows an example joint transmission procedure 300 that supports relative timing drift correction for distributed multi-user transmissions. The joint transmission procedure 300 may implement aspects of the system for wireless communications 100. In some aspects, the joint transmission procedure 300 may be implemented in a wireless network such as a Wi-Fi network implementing the one or more 802.11 family of standards, such as, 802.11be, 802.11ax, 802.11ac, or some other Wi-Fi standard. As described with reference to FIG. 2, wireless communication systems (such as, the system for wireless communications 100) may be configured to support distributed multi-user transmissions. A distributed multi-user transmission may be associated with a channel sounding procedure (such as, channel sounding procedure 200) and a joint transmission procedure (such as, joint transmission procedure 300).

As depicted herein, the joint transmission procedure 300 may be implemented by a set of participating AP(s) including a master AP and a slave AP. According to one or more aspects of the present disclosure, a master AP may transmit or otherwise provide an indication of a request to participate (such as, an invitation to participate) in a distributed multi-user transmission. In some implementations, an AP may signal to other AP(s) that extra resources are available. The other AP(s) may use the extra resources for performing wireless communications with their associated wireless stations. Generally, the AP capturing the channel may be referred to as a master AP, and the other AP(s) participating in the distributed multi-user transmission may be referred to as slave AP(s). In the example of FIG. 3, master AP 305 may be an example of an AP as described with reference to FIG. 1. Additionally, or alternatively, slave AP 310 may be an example of an AP as described with reference to FIG. 1. As part of a distributed multi-user transmission, one or more of the slave AP(s) may receive a request (such as, a request from the master AP) to participate in the distributed multi-user transmission. One or more slave AP(s) (such as, slave AP 310) may respond to the request by transmitting or otherwise providing an indication (not shown) of an intent to participate in the distributed multi-user transmission. Generally, the indication of intent to participate also may carry or otherwise convey an indication of the resources that the slave AP is requesting for the distributed multi-user transmission. In some implementations, the distributed multi-user transmission includes being distributed such that portions of functions are implemented at different physical locations by one or more physical components.

During the joint transmission procedure 300, a master AP 305 may be configured to transmit a synchronization trigger to one or more neighboring AP(s) (such as, slave AP 310). The master AP 305 may transmit or otherwise provide an indication of a synchronization trigger signal that carries or otherwise conveys an indication of the resources (such as, a resource grant or allocation) for the slave AP(s) 310. In some instances, the slave AP(s) 310 may use the indicated resources to participate in the distributed multi-user transmissions.

In some implementations, during a channel sounding procedure (such as, the channel sounding procedure 200, as described with reference to FIG. 2) a master AP (such as, the master AP 305) may transmit a first signal indicating that an event of the channel sounding procedure is performed at the master AP. Upon receiving the first signal, the slave AP(s) (such as, slave AP 310) may estimate a timing of reception of the first signal, and may perform the event of the channel sounding procedure based on the estimated timing. During the joint transmission procedure 300, the master AP 305 may transmit a second signal associated with a joint transmission procedure 300. For example, the master AP 305 may utilize the second signal to indicate a start time of the joint transmission at the master AP. The joint transmission procedure 300 may be initialized at the master AP 305, upon sending the second signal (such as, synchronization trigger 315-a). In some implementations, the synchronization trigger 315 (such as, synchronization trigger 315-a and synchronization trigger 315-b) may be transmitted prior to sending a distributed multi-user transmission 320 (such as, distributed multi-user transmission 320-a and distributed multi-user transmission 320-b). For example, the synchronization trigger 315 may specify timing of one or more subsequent joint transmissions. In some instances, the slave AP 310 may estimate a start time of the joint transmission to be performed at the slave AP 310, based on a timing of the received indication (such as, the timing of the synchronization trigger 315).

As described with reference to FIG. 3, the master AP 305 may send a transmission (such as, the distributed multi-user transmission 320-a) associated with a joint transmission procedure 300 at a time 335-a. Additionally, or alternatively, the slave AP 310 may send a transmission (such as, the distributed multi-user transmission 325-a) at a time 335-b. In some implementations, the distributed multi-user transmission 320-a at the master AP 305 and the distributed multi-user transmission 325-a at the slave AP 310 may have a timing offset 340. The timing offset 340 between AP(s) (such as, the master AP 305 and the slave AP 310) may be referred to as a joint transmission stage relative timing offset, or $\delta_2$. That is, there may be a first timing offset between the master AP 305 and the slave AP 310 during the event of channel sounding procedure (such as, the channel sounding procedure 200, as described with reference to FIG. 2), and a second timing offset between the master AP 305 and the slave AP 310 during the joint transmission procedure 300. In order to reduce the difference between the first timing offset (such as, the timing offset 250, as described with reference to FIG. 2) and the second timing offset 340, in the second signal transmitted during the joint transmission procedure 300 (such as, the synchronization trigger 315), the master AP 305 may indicate timing information relative to the first signal.

In some implementations, the synchronization trigger 315 may inform the slave AP(s) to discard new timing estimates and utilize relevant timing information indicated in the synchronization trigger 315. For instance, synchronization trigger 315-a may specify a timing of distributed multi-user transmission 320-a, and may inform the slave AP 310 to discard an estimate of a start time of the joint transmission to be performed at the slave AP 310. Additionally, or alternatively, synchronization trigger 315 may convey a timing value associated with the joint transmission, where the timing value if relative to an event of the channel sounding procedure or a previous synchronization trigger. This timing value may be referred to as $\Delta T_{synch}$. In this way, one or more neighboring AP(s) (such as, the slave AP 310) can preserve the relative timing offset between the channel sounding procedure and the joint transmission procedure. One or more synchronization triggers described herein may convey $\Delta T_{synch}$ and reduce the absolute difference between $\delta_2$ and $\delta_1$.

Generally, the joint transmission procedure 300 begins with the master AP 305 transmitting a synchronization trigger 315-a to one or more neighboring AP(s) (including the slave AP 310). In some implementations, the synchronization trigger 315-a may carry or otherwise provides an indication that an event for a joint transmission procedure 300 (such as, distributed multi-user transmission 320-a) at the master AP 305 is being performed after lapse of a time period since an event of a channel sounding procedure. In some aspects, the synchronization trigger 315-a may be transmitted during an initial period of the joint transmission procedure 300. In some implementations, the synchronization trigger 315-a may ensure cross-AP synchronization and symbol alignment for the distributed multi-user transmission. Upon receiving the synchronization trigger 315-a, the slave AP 310 may identify a time period based on the synchronization trigger 315-a. For example, the time period may be indicated in the synchronization trigger 315-a using a timing synchronization counter or a clock common to the master AP 305 and the slave AP 310. In some implementations, the slave AP 310 may determine a start time of a substantially simultaneous transmission (such as, the distributed multi-user transmission 325-a and distributed multi-user transmission 325-b) based on determining that the identified time period has elapsed since an event of the channel sounding procedure is performed by the slave AP 310. That is, the slave AP 310 may determine a start time for the distributed multi-user transmission 325-a based on a time period indicated in the synchronization trigger 315-a.

In some implementations, the master AP 305 may indicate a presence of the time period by setting a bit in the synchronization trigger 315 (such as, the synchronization trigger 315-a and the synchronization trigger 315-b). For instance, the synchronization trigger 315 may carry a bit which informs the slave AP 310 to disregard a fresh timing estimate or multiple timing estimates. In some implementations, the bit may be referred to as a freeze timing bit. In some instances, in one or more frames between the channel sounding procedure and the joint transmission procedure, the master AP 305 may set the bit to ensure that the timing estimates of the channel sounding procedure are preserved during the joint transmission procedure. In another example, a value may be associated with a timing information field that may indicate that a separate freeze timing bit is not required or a timing information (such as, the timing estimated during the joint transmission procedure 300) may be discarded. In some implementations, the timing information may not be contained in a frame.

In some implementations, the slave AP 310 may determine a time period indicated by the master AP 305 (such as, a time period indicated by the synchronization trigger 315-a), as a multiple of a timing grid interval. In some examples, the timing grid interval may be referred to as $T_{grid}$. A starting boundary of the synchronization trigger 315-a or a starting boundary of a joint transmission (as described with reference to FIG. 3), relative to when an NDP or an NDPA transmission occurred (as described with reference to FIG. 2), may be associated with a time value. This time value may be a multiple (M) of one or more time-slot durations and referred to as $M*T_{grid}$ According to one or more aspects of the present disclosure, the slave AP 310 may estimate a timing from the start of a frame associated with the synchronization trigger 315-a, and round it to the next numerical value of $M*T_{grid}$.

In some implementations, $\Delta T_{synch}$ may be a multiple of $M*T_{grid}$. For example, a timing estimate associated with the NDP or the NDPA transmission may be referred to as $T_1$ and a timing estimate associated with a trigger frame (such as, synchronization trigger 315) prior to the distributed multi-user transmission may be referred to as $T_2$. The slave AP 310 may be configured to round $T_2$ to a new time value referred to as $T_{new}$. $T_{new}$ may be associated with the addition of $T_1$ and $M*T_{grid}$, and may be represented by $T_{new}=M*T_{grid}$. According to one or more aspects of the present disclosure, the slave AP 310 may determine a time period indicated by the master AP 305 as a multiple of an absolute timing grid interval. For instance, one or more frames from the master AP 305 may have a start time associated with the one or more multiples of a constant $T_{grid}$. A constant $T_{grid}$ may reduce a data burden associated with packet detection at the slave AP 310. The slave AP 310 may compute a timing based on timing information included in the one or more frames. Additionally, or alternatively, the slave AP 310 may compute the timing based on rounding to a next value (such as, a nearest value) of $T_{grid}$ (such as, the constant $T_{grid}$).

In some implementations, the master AP 305 may indicate a presence of the timing grid by setting a bit included in a signal transmitted during the channel sounding procedure or in a signal transmitted during the joint transmission procedure 300. For example, the master AP 305 may indicate the presence of the timing grid (referred to as "$T_{grid}$ ON") by setting a bit within one or more frames transmitted from the master AP 305. In some implementations, the bit indicating the presence of the timing grid may inform the slave AP 310 to round an associated timing estimate to a value closest to the a multiple of an associated time-slot. In some implementations, the slave AP 310 may receive (once or periodically) a broadcast packet associated with the joint transmission (such as, distributed multi-user transmission), and determine a timing grid interval based on the received broadcast packet. The broadcast packet may include at least one packet of a beacon associated with the joint transmission, at least one packet of a request to send (RTS) signal associated with the joint transmission, at least one packet of a clear to send (CTS) signal associated with the joint transmission, or a combination. Additionally, or alternatively, a value of the timing grid may be fixed, and available to the master AP 305 and the slave AP 310.

In some implementations, the presence of the timing grid (such as, "$T_{grid}$ ON") may be referred to as a freeze timing bit, and may inform the slave AP 310 to refrain from updating the joint transmission timing based on a start of the packet timing estimation. In another example, the slave AP 310 may perform a timing estimation when decoding a frame carrying the one or more bits or the one or more fields associated with a freeze timing bit. In some implementations, the timing information may be carried in a preamble such that the slave AP 310 may use the computed timing instead of the estimated timing starting from an extreme high throughput modulated portion. Additionally, or alternatively, the bits or fields may generally be associated with one or more trigger frames, or one or more frames transmitted by the master AP 305 to the slave AP 310.

One or more aspects of the present disclosure may provide for the slave AP 310 to correct frequency and timing used to account for sampling clock offsets (as small frequency errors may lead to large phase ramps). In some implementations, the frequency offset, referred to as a, may be coupled with the sampling clock offset. For example, the slave AP 310 may estimate a frequency offset with respect to a master AP 305 prior to an NDP transmission. In another example the slave AP 310 may be configured to correct for the estimated implementations offset by adjusting an oscillator clock or by applying a phase ramp in time. In some implementations, the digital correction applied by the slave AP 310 may be adjusted to increase accuracy. The frequency associated with the slave AP 310 may be referred to as $f_{slave}$ and the frequency associated with the master AP 305 may be referred to as $f_{master}$. For example, an error associated with the digital correction may be referred to as $\Delta f$ which may be the difference between $f_{master}$ and $f_{slave}$ ($\Delta f=f_{master}-f_{slave}$).

In an alternative example, $\Delta f$ may be determined as a product of the frequency offset and a corrected frequency ($f_c$), $\Delta f=\alpha*f_c$. In other words, the frequency offset, $\alpha$, may be the ratio between the error associated with the correction and the corrected frequency $$\alpha = \frac{\Delta f}{f_c}.$$

In some instances, when a digital correction is performed by the slave AP 310, a sampling clock may be associated with the frequency offset a. The slave AP 310 may account for the frequency offset a for a duration associated with the NDP. Additionally, or alternatively, the slave AP 310 may make an adjustment to the timing associated with the joint transmission (such as, prior to the joint transmission). In some implementations, the adjustment may be associated with a correction factor (1−α) to increase the accuracy of a timing $T_{new}$. For example, the slave AP 310 may calculate the timing $T_{new}$ by the following equation:

$$T_{new}=T_1+M*T_{grid}*(1-\alpha)$$

It may be understood that the approaches described herein may be applied to other types of distributed multi-user transmissions, such as coordinated orthogonal frequency-division multiple access (OFDMA) transmissions, coordinated beamforming transmissions, etc.

Figure 4:
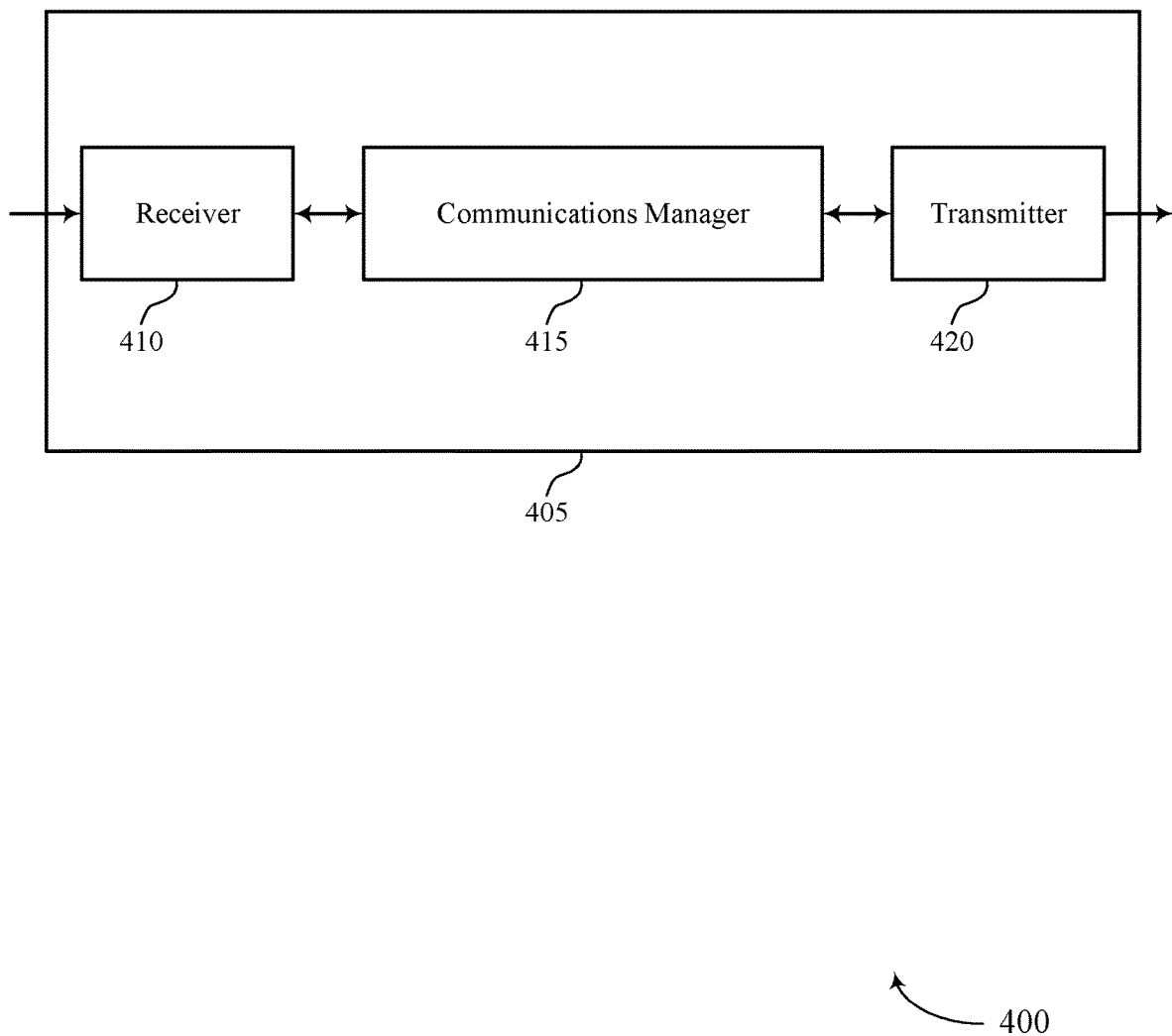
FIGS. 4 and 5 show block diagrams of example devices that support relative timing drift correction for distributed multi-user transmissions.

FIG. 4 shows a block diagram 400 of an example wireless device 405 that supports relative timing drift correction for distributed multi-user transmissions. The wireless device 405 may be an example of aspects of an AP as described herein. The wireless device 405 may be an example of aspects of a master AP and an example of aspects of a stave AP as described herein. The wireless device 405 may include a receiver 410, a communications manager 415, and a transmitter 420. The wireless device 405 also may include a processor. Each of these components may be in communication with one another (such as via one or more buses).

The receiver 410 may receive information such as packets, user data, or control information associated with various information channels (such as control channels, data channels, and information related to relative timing drift correction for distributed substantially simultaneous transmissions, etc.). Information may be passed on to other components of the device. The receiver 410 may be an example of aspects of the transceiver 720 described with reference to FIG. 7. The receiver 410 may utilize a single antenna or a set of antennas.

The communications manager 415 may receive, from a second AP, a first signal associated with a channel sounding procedure to be performed simultaneously by the second AP and the first AP, receive, from the second AP and prior to a substantially simultaneous transmission by the second AP and the first AP, a second signal including timing information relative to the first signal, determine a start time of a substantially simultaneous transmission at the first AP based on the timing information, and initiate the substantially simultaneous transmission according to the determined start time. The communications manager 415 also may transmit, to a first AP, a first signal associated with a channel sounding procedure, transmit, to the first AP, a second signal including timing information relative to the first signal, where a start time of a substantially simultaneous transmission at the first AP is determined based on the timing information, and perform, in conjunction with the first AP, the substantially simultaneous transmission, where the substantially simultaneous transmission at the first AP is performed according to the determined start time. The communications manager 415 may be an example of aspects of the communications manager 710 described herein.

The communications manager 415, or its sub-components, may be implemented in hardware, code (such as software or firmware) executed by a processor, or any combination thereof. If implemented in code executed by a processor, the functions of the communications manager 415, or its sub-components may be executed by a general-purpose processor, a DSP, an application-specific integrated circuit (ASIC), a field programmable gate array (FPGA), or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some implementations, the communications manager 415, or its sub-components, may be a separate and distinct component. In some implementations, the communications manager 415, or its sub-components, may be combined with one or more other hardware components, including but not limited to an input/output (I/O) component, a transceiver, a network server, another computing device, one or more other components described in the present disclosure, or a combination thereof.

In some implementations, the communications manager 415 may include a wireless modem chipset, and the receiver 410 and the transmitter 420 may include analog components (such as amplifiers, filters, phase shifters, and antennas) for receiving and transmitting wireless signals, respectively. The communications manager 415 may obtain and decode signals received over a wireless channel from the receiver 410 via a receive interface. The communications manager 415 may output signals to the transmitter for transmission over the wireless channel via a transmit interface.

The transmitter 420 may transmit signals generated by other components of the device. In some implementations, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

The communications manager 415 as described herein may be implemented to realize one or more potential advantages. For example, some implementations may allow the wireless device 405 to more efficiently coordinate communications (such as, communications including synchronization trigger) in next generation WLANs, that may include devices such as the wireless device 405. Based on implementing the relative timing drift correction as described herein, a processor of a user equipment (UE) (such as controlling the receiver 410, the transmitter 420, or the transceiver 720 as described with reference to FIG. 7) may reduce the timing drift, while maintaining backwards compatibility, and allow increased capabilities of AP(s) and stations in a WLAN.

Figure 5:
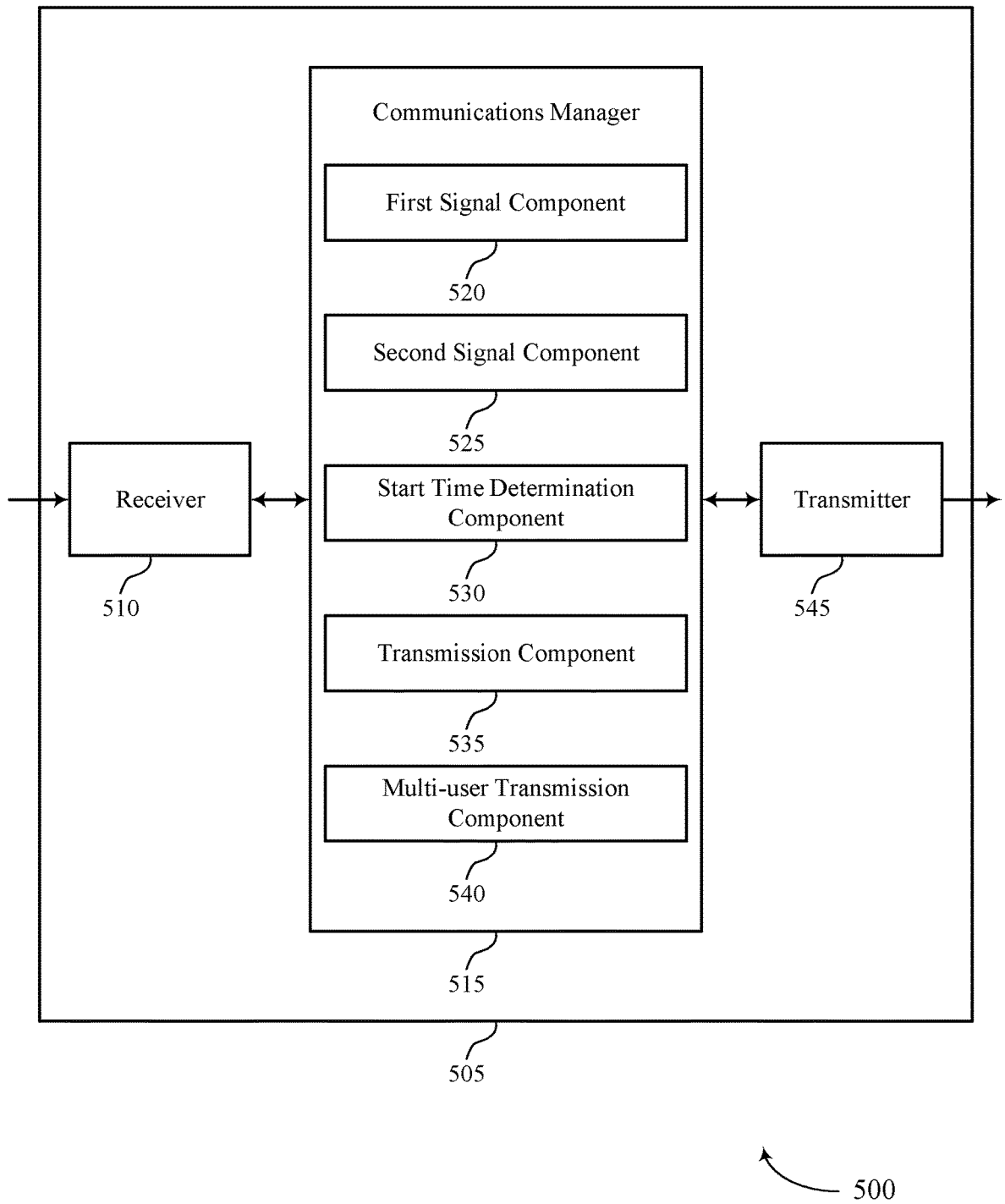

FIG. 5 shows a block diagram 500 of an example wireless device 505 that supports relative timing drift correction for distributed multi-user transmissions. The wireless device 505 may be an example of aspects of a wireless device 405 or an AP 105 as described herein. The wireless device 505 may include a receiver 510, a communications manager 515, and a transmitter 545. The wireless device 505 also may include a processor. Each of these components may be in communication with one another (such as via one or more buses).

The receiver 510 may receive information such as packets, user data, or control information associated with various information channels (such as control channels, data channels, and information related to relative timing drift correction for distributed simultaneous transmissions, etc.). Information may be passed on to other components of the device. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a first signal component 520, a second signal component 525, a start time determination component 530, a transmission component 535, and a simultaneous transmission component 540. The communications manager 515 may be an example of aspects of the communications manager 710 described herein.

The first signal component 520 may receive, from a second AP, a first signal associated with a channel sounding procedure to be performed simultaneously by the second AP and the first AP. The second signal component 525 may receive, from the second AP and prior to a substantially simultaneous transmission by the second AP and the first AP, a second signal including timing information relative to the first signal. The start time determination component 530 may determine a start time of a substantially simultaneous transmission at the first AP based on the timing information. The transmission component 535 may initiate the substantially simultaneous transmission according to the determined start time.

The first signal component 520 may transmit, to a first AP, a first signal associated with a channel sounding procedure. The second signal component 525 may transmit, to the first AP, a second signal including timing information relative to the first signal, where a start time of a substantially simultaneous transmission at the first AP is determined based on the timing information. The substantially simultaneous transmission component 540 may perform, in conjunction with the first AP, the substantially simultaneous transmission, where the substantially simultaneous transmission at the first AP is performed according to the determined start time.

The transmitter 545 may transmit signals generated by other components of the device. In some implementations, the transmitter 545 may be collocated with a receiver 510 in a transceiver module. For example, the transmitter 545 may be an example of aspects of the transceiver 720 described with reference to FIG. 7. The transmitter 545 may utilize a single antenna or a set of antennas.

Figure 6:
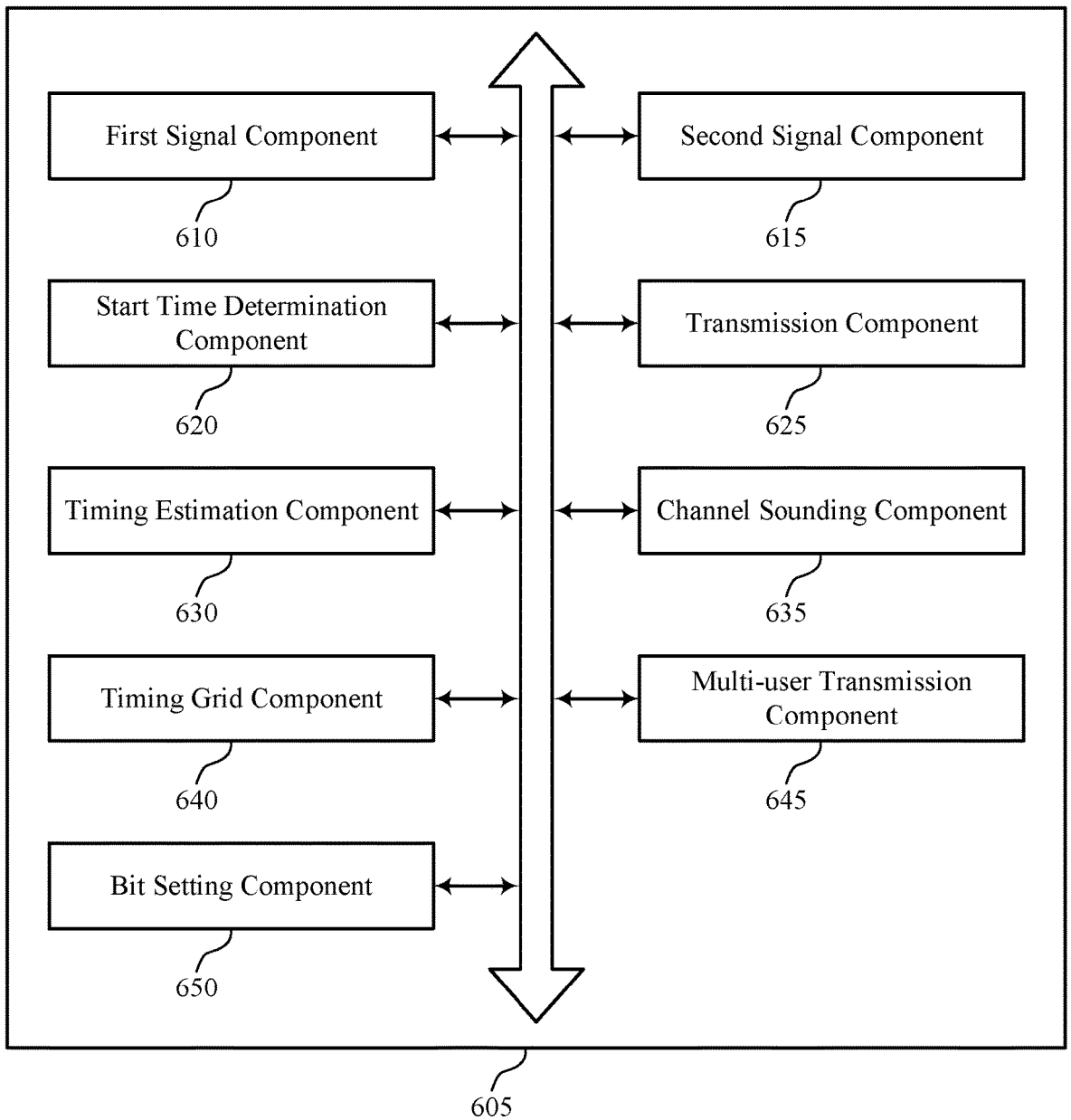
FIG. 6 shows a block diagram of an example communications manager that supports relative timing drift correction for distributed multi-user transmissions.

FIG. 6 shows a block diagram 600 of an example communications manager 605 that supports relative timing drift correction for distributed multi-user transmissions. The communications manager 605 may be an example of aspects of a communications manager 415, a communications manager 515, or a communications manager 710 described herein. The communications manager 605 may include a first signal component 610, a second signal component 615, a start time determination component 620, a transmission component 625, a timing estimation component 630, a channel sounding component 635, a timing grid component 640, a multi-user transmission component 645, and a bit setting component 650. Each of these modules may communicate, directly or indirectly, with one another (such as via one or more buses).

The first signal component 610 may receive, from a second AP, a first signal associated with a channel sounding procedure to be performed simultaneously by the second AP and the first AP. In some implementations, the first signal component 610 may transmit, to a first AP, a first signal associated with a channel sounding procedure. The second signal component 615 may receive, from the second AP and prior to a substantially simultaneous transmission by the second AP and the first AP, a second signal including timing information relative to the first signal.

In some implementations, the second signal component 615 may transmit, to the first AP, a second signal including timing information relative to the first signal, where a start time of a substantially simultaneous transmission at the first AP is determined based on the timing information. In some implementations, the second signal component 615 may identify a bit included in the second signal to indicate that the start time of the substantially simultaneous transmission at the first AP is to be determined using an estimated time of reception of the first signal at the first AP and the timing information relative to the first signal, where determining the start time of the substantially simultaneous transmission is based on the identified bit.

In some implementations, the second signal component 615 may configure the second signal to indicate a time period, where the start time of the substantially simultaneous transmission is determined based on determining that the configured time period has elapsed since an event of the channel sounding procedure is performed by the first AP. In some implementations, the second signal component 615 may configure the second signal to indicate a time period, the time period being a multiple of a timing grid interval, the start time of the substantially simultaneous transmission is determined based on determining that the identified time period has elapsed since an event of the channel sounding procedure is performed by the first AP.

In some implementations, a timing synchronization counter, a clock common to the first AP and the second AP, or a combination thereof. In some implementations, the second signal associated with the substantially simultaneous transmission includes a synchronization trigger signal to the first AP prior to the substantially simultaneous transmission. In some implementations, the timing information relative to the first signal is included in at least one of a payload of the second signal, a preamble of the second signal, or a combination thereof. In some implementations, a timing of reception of a synchronization trigger signal, a timing of reception of beginning of an NDPA, a timing of reception of end of the NDPA, a timing associated with a beginning of an NDP, a timing associated with an end of an NDP, or a combination thereof.

In some implementations, a timing synchronization counter, a clock common to the first AP and the second AP, or a combination thereof. In some implementations, the second signal associated with the substantially simultaneous transmission includes a synchronization trigger signal to the first AP. In some implementations, the timing information relative to the first signal is included in at least one of a payload of the second signal, a preamble of the second signal, or a combination thereof.

The start time determination component 620 may determine a start time of a substantially simultaneous transmission at the first AP based on the timing information. In some implementations, identifying a time period based on the second signal, where determining the start time of the substantially simultaneous transmission includes determining that the identified time period has elapsed since an event of the channel sounding procedure is performed by the first AP.

In some implementations, determining a time period based on the second signal, the time period being a multiple of a timing grid interval, where determining the start time of the substantially simultaneous transmission includes determining that the identified time period has elapsed since an event of the channel sounding procedure is performed by the first AP. In some implementations, a timing of reception of a synchronization trigger signal, a timing of reception of beginning of an NDPA, a timing of reception of end of the NDPA, a timing associated with a beginning of an NDP, a timing associated with an end of an NDP, or a combination thereof.

The transmission component 625 may initiate the substantially simultaneous transmission according to the determined start time. The multi-user transmission component 645 may perform, in conjunction with the first AP, the substantially simultaneous transmission, where the substantially simultaneous transmission at the first AP is performed according to the determined start time.

The timing estimation component 630 may estimate a timing of reception of the first signal associated with the channel sounding procedure to be performed by the second AP. In some implementations, the timing estimation component 630 may estimate a timing of reception of the first signal associated with the channel sounding procedure. In some implementations, estimating a timing of reception of the second signal associated with the substantially simultaneous transmission, where determining the start time of the substantially simultaneous transmission includes rounding off the timing of reception of the second signal to a multiple of a timing grid interval.

The channel sounding component 635 may perform, by the first AP, the channel sounding procedure based on the timing of reception of the first signal. The timing grid component 640 may determine the timing grid boundaries based on the first signal associated with the channel sounding procedure, where the presence of the timing grid is indicated by setting a bit included in the first signal or the second signal.

In some implementations, the timing grid component 640 may receive a broadcast packet associated with the substantially simultaneous transmission. In some implementations, the timing grid component 640 may determine the timing grid interval based on the received broadcast packet. In some implementations, setting a bit included in the first signal associated with the channel sounding procedure to indicate the presence of a timing grid, where transmitting the first signal includes transmitting the bit to the first AP.

In some implementations, the timing grid component 640 may transmit a broadcast packet associated with the substantially simultaneous transmission, where the timing grid interval is determined based on the transmitted broadcast packet. In some implementations, setting a bit included in the second signal to indicate the presence of a timing grid, where transmitting the second signal includes transmitting the bit to the first AP. The bit setting component 650 may set a bit included in the second signal to indicate that the start time of the substantially simultaneous transmission at the first AP is to be determined using an estimated time of reception of the first signal at the first AP and the timing information relative to the first signal.

In some implementations, the broadcast packet includes at least one packet of a beacon associated with the substantially simultaneous transmission, at least one packet of a RTS signal associated with the substantially simultaneous transmission, at least one packet of a CTS signal associated with the substantially simultaneous transmission, or a combination thereof. In some implementations, the broadcast packet includes at least one packet of a beacon associated with the substantially simultaneous transmission, at least one packet of a RTS signal associated with the substantially simultaneous transmission, at least one packet of a CTS signal associated with the substantially simultaneous transmission, or a combination thereof.

Figure 7:
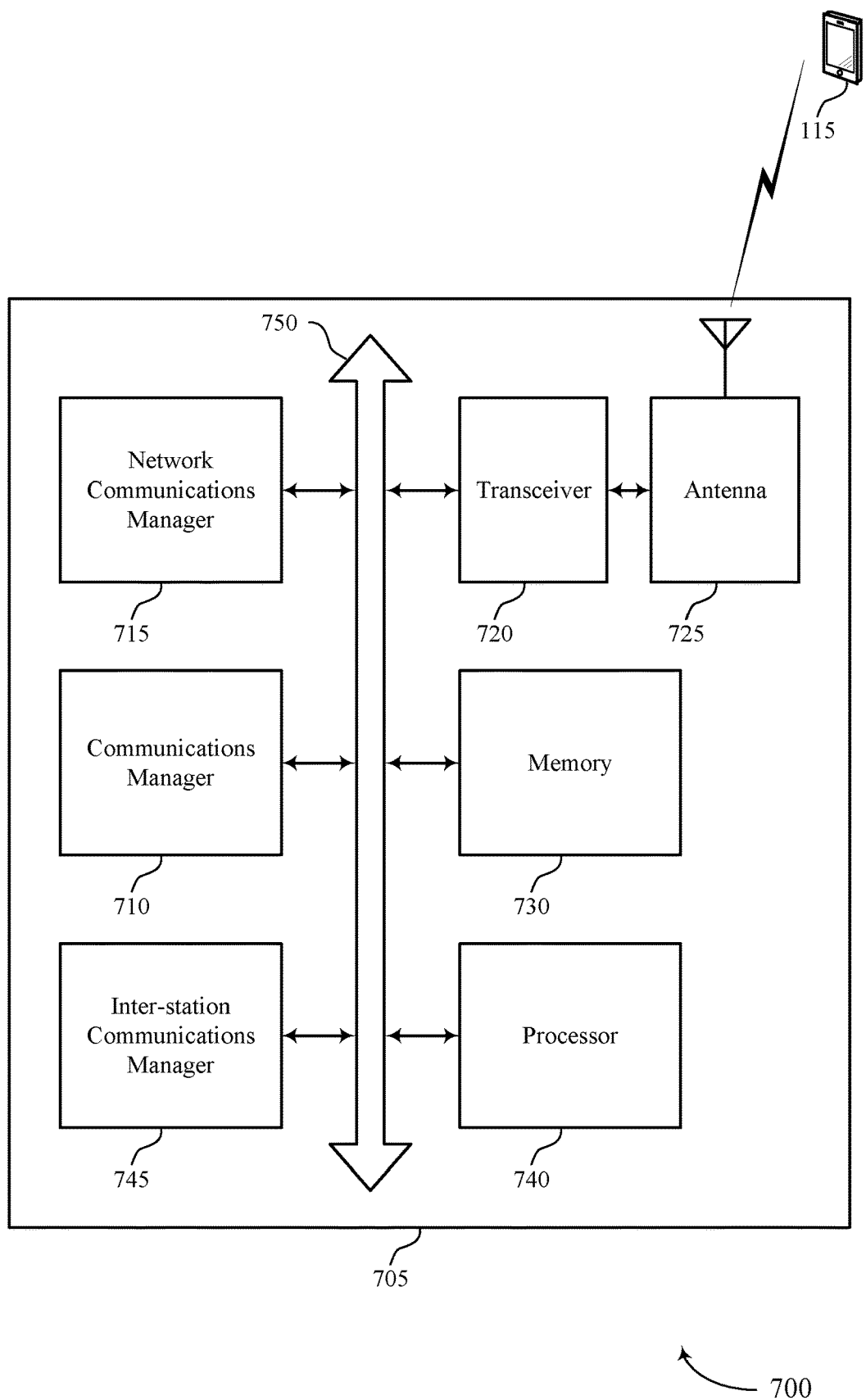
FIG. 7 shows a diagram of an example system including a device that supports relative timing drift correction for distributed multi-user transmissions.

FIG. 7 shows a diagram of an example system 700 including a device 705 that supports relative timing drift correction for distributed multi-user transmissions. The device 705 may be an example of or include the components of wireless device 405, wireless device 505, or an AP as described herein. The device 705 may include components for bi-directional voice and data communications including components for transmitting and receiving communications, including a communications manager 710, a network communications manager 715, a transceiver 720, an antenna 725, memory 730, a processor 740, and an inter-station communications manager 745. These components may be in electronic communication via one or more buses (such as bus 750).

The communications manager 710 may receive, from a second AP, a first signal associated with a channel sounding procedure to be performed by the second AP, receive, from the second AP and prior to a substantially simultaneous transmission, a second signal including timing information relative to the first signal, determine a start time of a substantially simultaneous transmission at the first AP based on the timing information, and initiate the substantially simultaneous transmission according to the determined start time. The communications manager 710 also may transmit, to a first AP, a first signal associated with a channel sounding procedure, transmit, to the first AP, a second signal including timing information relative to the first signal, where a start time of a substantially simultaneous transmission at the first AP is determined based on the timing information, and perform, in conjunction with the first AP, the substantially simultaneous transmission, where the substantially simultaneous transmission at the first AP is performed according to the determined start time.

The network communications manager 715 may manage communications with the core network (such as via one or more wired backhaul links). For example, the network communications manager 715 may manage the transfer of data communications for client devices, such as one or more UEs.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 also may include a modem to modulate the packets and provide the modulated packets to the antennas for transmission, and to demodulate packets received from the antennas. In some implementations, the wireless device may include a single antenna 725. However, in some implementations the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some implementations, the memory 730 may contain, among other things, a basic input output system (BIOS) which may control basic hardware or software operation such as the interaction with peripheral components or devices.

The processor 740 may include an intelligent hardware device, (such as a general-purpose processor, a DSP, a CPU, a microcontroller, an ASIC, an FPGA, a programmable logic device, a discrete gate or transistor logic component, a discrete hardware component, or any combination thereof). In some implementations, the processor 740 may be configured to operate a memory array using a memory controller. In some other implementations, a memory controller may be integrated into processor 740. The processor 740 may be configured to execute computer-readable instructions stored in a memory to perform various functions (such as functions or tasks supporting relative timing drift correction for distributed substantially simultaneous transmissions).

The inter-station communications manager 745 may manage communications with other AP 105, and may include a controller or scheduler for controlling communications with stations 115 in cooperation with other AP(s) 105. For example, the inter-station communications manager 745 may coordinate scheduling for transmissions to stations 115 for various interference mitigation techniques such as beamforming or joint transmission. In some implementations, the inter-station communications manager 745 may provide an X2 interface within an LTE/LTE-A wireless communication network technology to provide communication between AP(s) 105.

In some implementations, the communications manager 710 may be implemented as a wireless modem that connects to a receiver via, or over a first interface and to a transmitter, via, or over a second interface. The wireless modem may obtain and decode signals received wirelessly from the receiver via, or over the first interface, and may output signals for wireless transmission via, or over the transmitter via the second interface.

Figure 8:
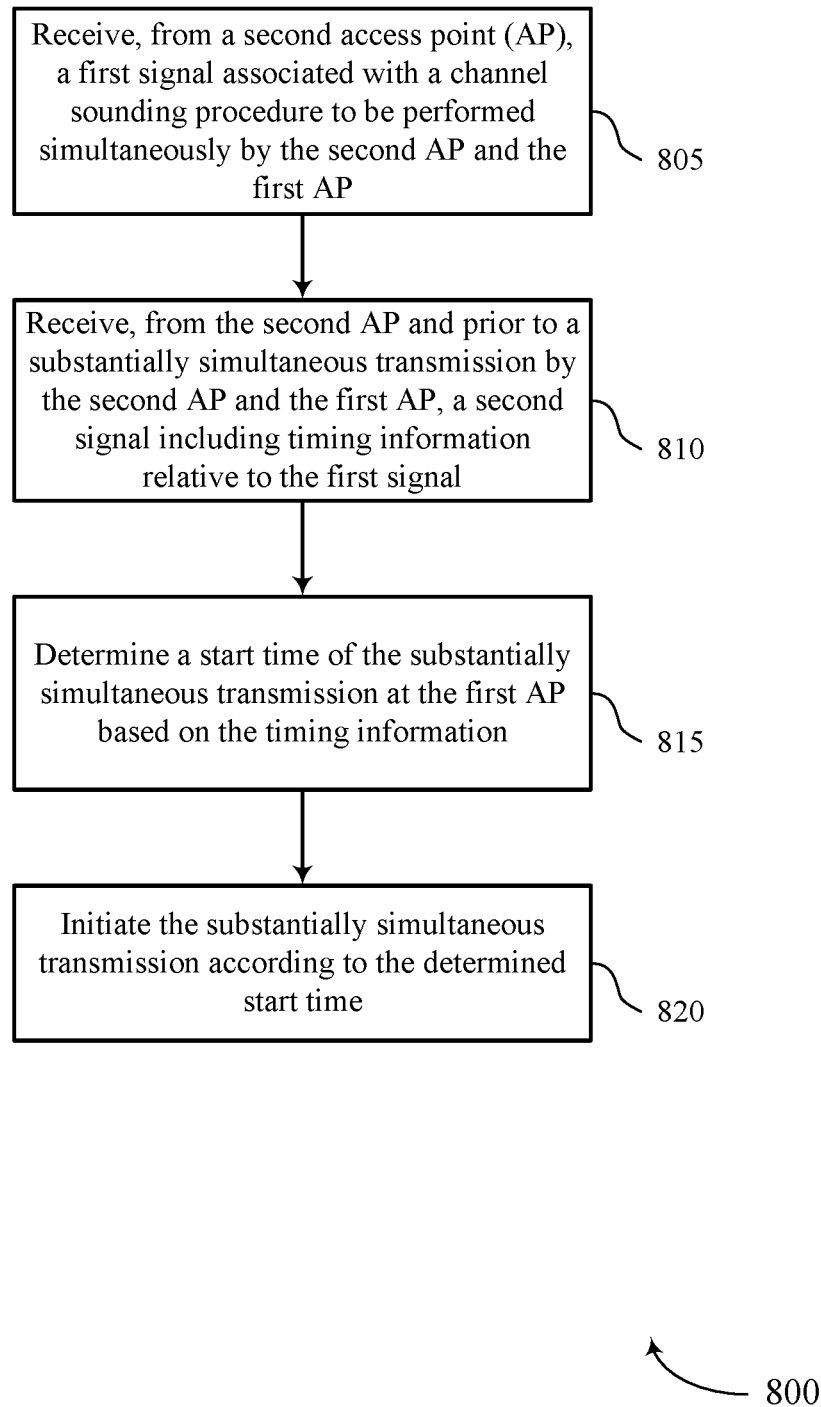
FIGS. 8-10 show flowcharts illustrating example methods that support relative timing drift correction for distributed multi-user transmissions.

FIG. 8 shows a flowchart illustrating an example method 800 that supports relative timing drift correction for distributed multi-user transmissions. The operations of method 800 may be implemented by an AP or its components as described herein. For example, the operations of method 800 may be performed by a communications manager as described with reference to FIGS. 4-7. In some implementations, an AP may execute a set of instructions to control the functional elements of the AP to perform the functions described herein. Additionally, or alternatively, an AP may perform aspects of the functions described herein using special-purpose hardware.

At 805, the AP may receive, from a second AP, a first signal associated with a channel sounding procedure to be performed simultaneously by the second AP and the first AP. The operations of 805 may be performed according to the methods described herein. In some implementations, aspects of the operations of 805 may be performed by a first signal component as described with reference to FIGS. 4-7.

At 810, the AP may receive, from the second AP and prior to a substantially simultaneous transmission by the second AP and the first AP, a second signal including timing information relative to the first signal. The operations of 810 may be performed according to the methods described herein. In some implementations, aspects of the operations of 810 may be performed by a second signal component as described with reference to FIGS. 4-7.

At 815, the AP may determine a start time of the substantially simultaneous transmission at the first AP based on the timing information. The operations of 815 may be performed according to the methods described herein. In some implementations, aspects of the operations of 815 may be performed by a start time determination component as described with reference to FIGS. 4-7.

At 820, the AP may initiate the substantially simultaneous transmission according to the determined start time. The operations of 820 may be performed according to the methods described herein. In some implementations, aspects of the operations of 820 may be performed by a transmission component as described with reference to FIGS. 4-7.

Figure 9:
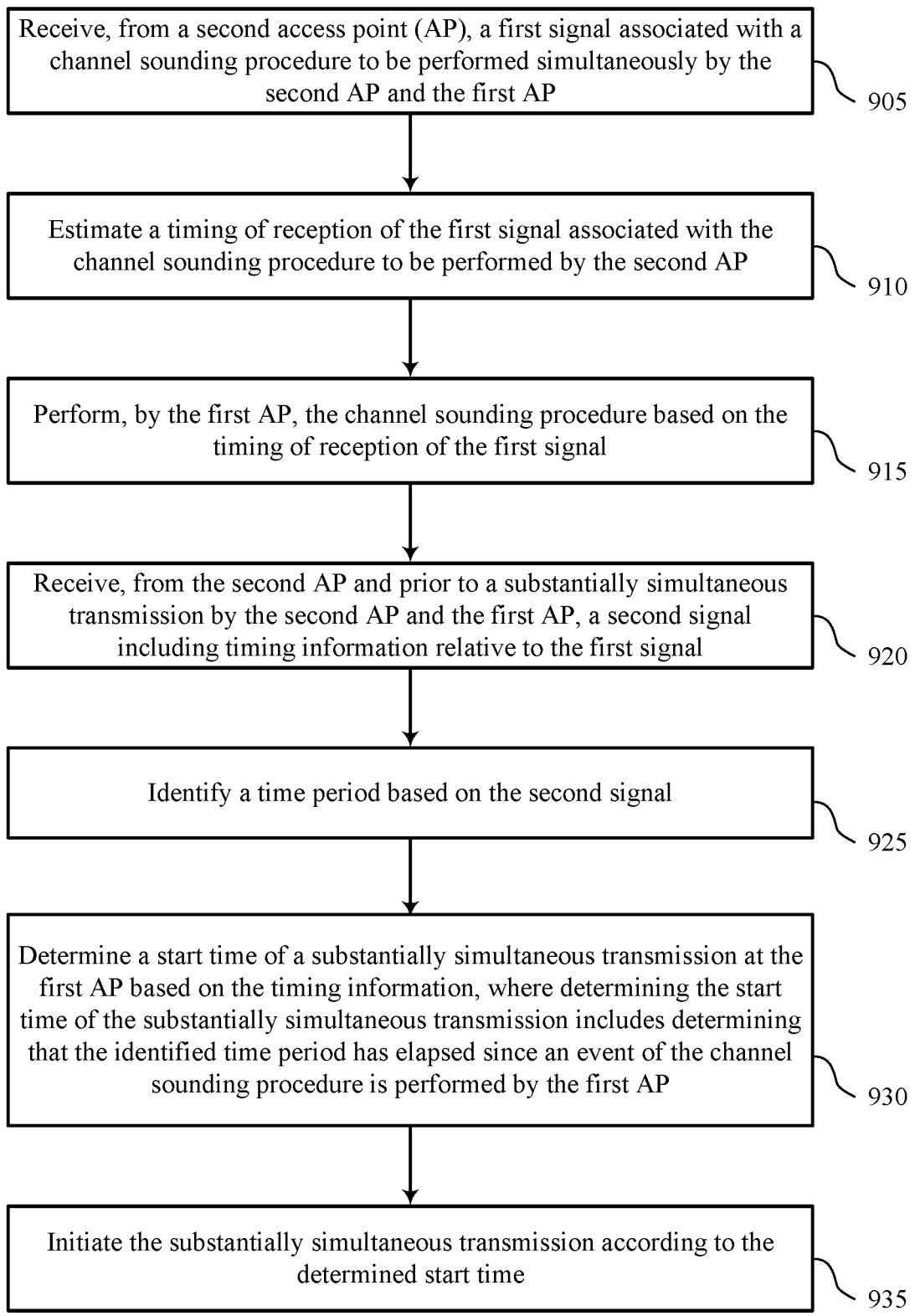

FIG. 9 shows a flowchart illustrating an example method 900 that supports relative timing drift correction for distributed multi-user transmissions. The operations of method 900 may be implemented by an AP or its components as described herein. For example, the operations of method 900 may be performed by a communications manager as described with reference to FIGS. 4-7. In some implementations, an AP may execute a set of instructions to control the functional elements of the AP to perform the functions described herein. Additionally, or alternatively, an AP may perform aspects of the functions described herein using special-purpose hardware.

At 905, the AP may receive, from a second AP, a first signal associated with a channel sounding procedure to be performed simultaneously by the second AP and the first AP. The operations of 905 may be performed according to the methods described herein. In some implementations, aspects of the operations of 905 may be performed by a first signal component as described with reference to FIGS. 4-7.

At 910, the AP may estimate a timing of reception of the first signal associated with the channel sounding procedure to be performed by the second AP. The operations of 910 may be performed according to the methods described herein. In some implementations, aspects of the operations of 910 may be performed by a timing estimation component as described with reference to FIGS. 4-7.

At 915, the AP may perform, by the first AP, the channel sounding procedure based on the timing of reception of the first signal. The operations of 915 may be performed according to the methods described herein. In some implementations, aspects of the operations of 915 may be performed by a channel sounding component as described with reference to FIGS. 4-7.

At 920, the AP may receive, from the second AP and prior to a substantially simultaneous transmission by the second AP and the first AP, a second signal including timing information relative to the first signal. The operations of 920 may be performed according to the methods described herein. In some implementations, aspects of the operations of 920 may be performed by a second signal component as described with reference to FIGS. 4-7.

At 925, the AP may identify a time period based on the second signal. The operations of 925 may be performed according to the methods described herein. In some implementations, aspects of the operations of 925 may be performed by a start time determination component as described with reference to FIGS. 4-7.

At 930, the AP may determine a start time of a substantially simultaneous transmission at the first AP based on the timing information, where determining the start time of the substantially simultaneous transmission includes determining that the identified time period has elapsed since an event of the channel sounding procedure is performed by the first AP. The operations of 930 may be performed according to the methods described herein. In some implementations, aspects of the operations of 930 may be performed by a start time determination component as described with reference to FIGS. 4-7.

At 935, the AP may initiate the substantially simultaneous transmission according to the determined start time. The operations of 935 may be performed according to the methods described herein. In some implementations, aspects of the operations of 935 may be performed by a transmission component as described with reference to FIGS. 4-7.

Figure 10:
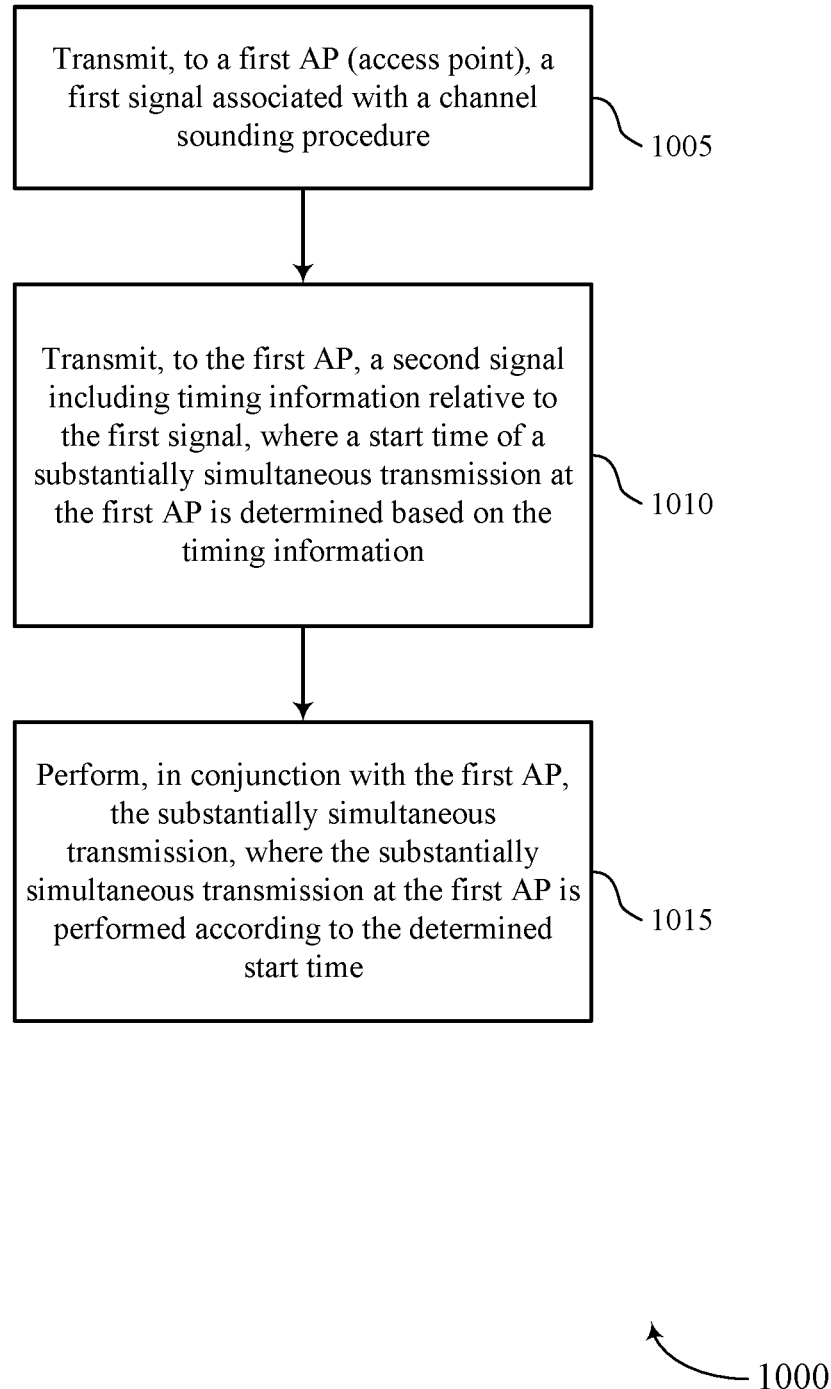

FIG. 10 shows a flowchart illustrating an example method 1000 that supports relative timing drift correction for distributed multi-user transmissions. The operations of method 1000 may be implemented by an AP or its components as described herein. For example, the operations of method 1000 may be performed by a communications manager as described with reference to FIGS. 4-7. In some implementations, an AP may execute a set of instructions to control the functional elements of the AP to perform the functions described herein. Additionally, or alternatively, an AP may perform aspects of the functions described below using special-purpose hardware.

At 1005, the AP may transmit, to a first AP, a first signal associated with a channel sounding procedure. The operations of 1005 may be performed according to the methods described herein. In some implementations, aspects of the operations of 1005 may be performed by a first signal component as described with reference to FIGS. 4-7.

At 1010, the AP may transmit, to the first AP, a second signal including timing information relative to the first signal, where a start time of a substantially simultaneous transmission at the first AP is determined based on the timing information. The operations of 1010 may be performed according to the methods described herein. In some implementations, aspects of the operations of 1010 may be performed by a second signal component as described with reference to FIGS. 4-7.

At 1015, the AP may perform, in conjunction with the first AP, the substantially simultaneous transmission, where the substantially simultaneous transmission at the first AP is performed according to the determined start time. The operations of 1015 may be performed according to the methods described herein. In some implementations, aspects of the operations of 1015 may be performed by a substantially simultaneous transmission component as described with reference to FIGS. 4-7.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), an FPGA or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can in some implementations be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. A method for wireless communication at a first access point (AP), comprising:
   receiving, from a second AP, a first signal associated with a channel sounding procedure to be performed simultaneously by the second AP and the first AP;
   determining a start time of a substantially simultaneous transmission at the first AP in accordance with timing information relative to the first signal associated with the channel sounding procedure to be performed by the second AP; and
   transmitting the substantially simultaneous transmission according to the start time.

2. The method of claim 1, further comprising:
   receiving, from the second AP and prior to the substantially simultaneous transmission by the second AP and the first AP, a second signal comprising the timing information relative to the first signal.

3. The method of claim 1, further comprising:
   transmitting a second signal associated with the channel sounding procedure in accordance with estimating the timing information relative to the first signal.

4. The method of claim 1, further comprising:
   estimating a timing of reception of the first signal associated with the channel sounding procedure to be performed by the second AP; and
   performing, by the first AP, the channel sounding procedure in accordance with the timing of reception of the first signal.

5. The method of claim 1, further comprising:
   receiving a second signal indicating a time period, wherein determining the start time of the substantially simultaneous transmission comprises determining that the time period has elapsed since an event of the channel sounding procedure is performed by the first AP.

6. The method of claim 5, wherein the event of the channel sounding procedure comprises one or more of: a timing of reception of a synchronization trigger signal prior to a null data packet (NDP), a timing of reception of beginning of a null data packet announcement (NDPA), a timing of reception of end of the NDPA, a timing associated with a beginning of the NDP, a timing associated with an end of the NDP, or a combination thereof.

7. The method of claim 5, wherein the second signal includes one or more of: a timing synchronization counter, a clock common to the first AP and the second AP, or a combination thereof.

8. The method of claim 1, further comprising:
   receiving a second signal indicating a time period, the time period being a multiple of a timing grid interval, wherein determining the start time of the substantially simultaneous transmission comprises determining that the time period has elapsed since an event of the channel sounding procedure is performed by the first AP.

9. The method of claim 8, wherein receiving the first signal comprises:
   receiving the first signal indicating timing grid boundaries, wherein a presence of the timing grid is indicated by a bit included in the first signal or the second signal.

10. The method of claim 8, further comprising:
    receiving a broadcast packet associated with the substantially simultaneous transmission; and
    determining the timing grid interval associated with the received broadcast packet.

11. The method of claim 10, wherein the broadcast packet comprises at least one packet of a beacon associated with the substantially simultaneous transmission, at least one packet of a request to send (RTS) signal associated with the substantially simultaneous transmission, at least one packet of a clear to send (CTS) signal associated with the substantially simultaneous transmission, or a combination thereof.

12. The method of claim 1, further comprising:
    estimating a timing of reception of the first signal associated with the channel sounding procedure; and
    estimating a timing of reception of a second signal associated with the substantially simultaneous transmission, wherein determining the start time of the substantially simultaneous transmission comprises rounding the timing of reception of the second signal to a multiple of a timing grid interval.

13. An apparatus for wireless communication at a first access point (AP), comprising:
    a first interface;
    a second interface; and
    a wireless modem configured to:
      obtain via the first interface a first signal associated with a channel sounding procedure to be performed simultaneously by the second AP and the first AP;
      determine a start time of a substantially simultaneous transmission at the first AP in accordance with timing information relative to the first signal associated with the channel sounding procedure to be performed by the second AP; and
      output the substantially simultaneous transmission according to the start time.

14. The apparatus of claim 13, wherein the wireless modem is further configured to:
    obtain via the first interface and prior to the substantially simultaneous transmission by the second AP and the first AP, a second signal comprising the timing information relative to the first signal.

15. The apparatus of claim 13, wherein the wireless modem is further configured to:
    output a second signal associated with the channel sounding procedure in accordance with estimating the timing information relative to the first signal.

16. The apparatus of claim 13, wherein the wireless modem is further configured to:
  estimate a timing of reception of the first signal associated with the channel sounding procedure to be performed by the second AP; and
  perform, by the first AP, the channel sounding procedure in accordance with the timing of reception of the first signal.

17. The apparatus of claim 13, wherein the wireless modem is further configured to:
  obtain via the first interface a second signal indicating a time period, wherein determining the start time of the substantially simultaneous transmission comprises determining that the time period has elapsed since an event of the channel sounding procedure is performed by the first AP.

18. The apparatus of claim 17, wherein the event of the channel sounding procedure comprises one or more of: a timing of reception of a synchronization trigger signal prior to a null data packet (NDP), a timing of reception of beginning of a null data packet announcement (NDPA), a timing of reception of end of the NDPA, a timing associated with a beginning of the NDP, a timing associated with an end of the NDP, or a combination thereof.

19. A non-transitory computer-readable medium storing code for wireless communication at a first access point (AP), the code comprising instructions executable by a processor to:
  receive, from a second AP, a first signal associated with a channel sounding procedure to be performed simultaneously by the second AP and the first AP;
  determine a start time of a substantially simultaneous transmission at the first AP in accordance with timing information relative to the first signal associated with the channel sounding procedure to be performed by the second AP; and
  transmit the substantially simultaneous transmission according to the start time.

20. The non-transitory computer-readable medium of claim 19, wherein the instructions are further executable by the processor to:
  receive, from the second AP and prior to the substantially simultaneous transmission by the second AP and the first AP, a second signal comprising the timing information relative to the first signal.

* * * * *